I. B. KEMPSHALL.
VEHICLE TIRE.
APPLICATION FILED MAR. 21, 1910.
957,166.
Patented May 3, 1910.
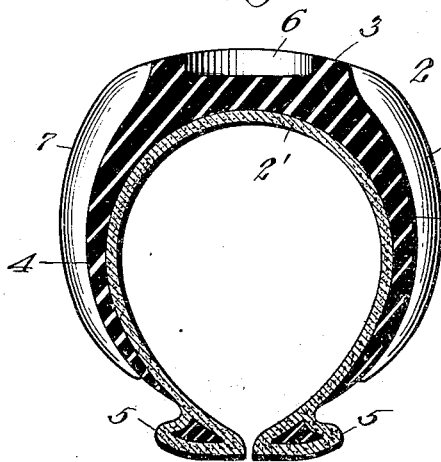
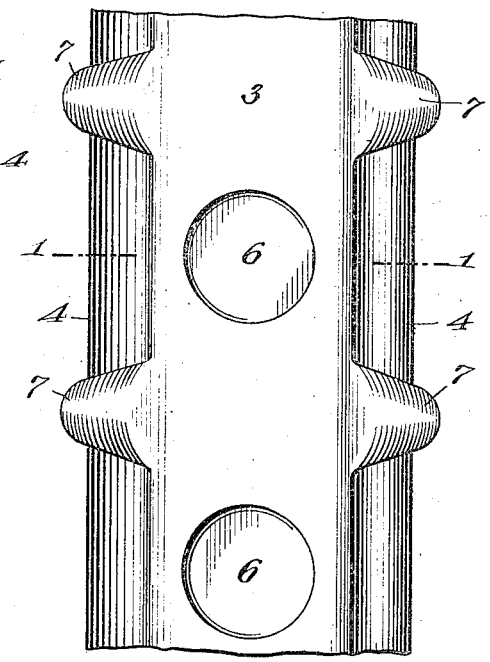
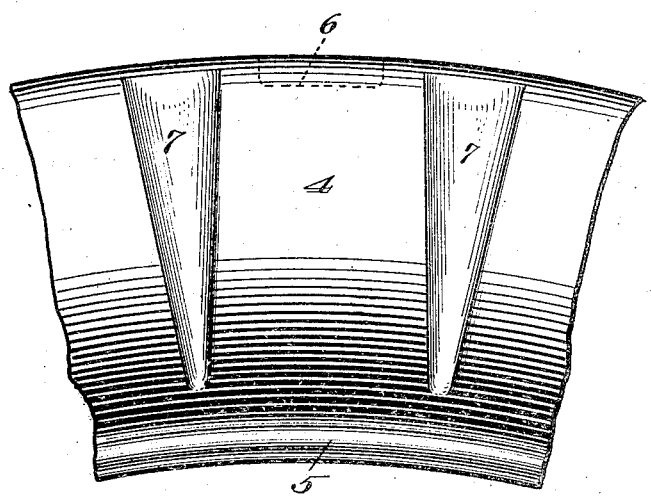
WITNESSES:
INVENTOR
Iva Belle Kempshall
BY
ATTORNEY

UNITED STATES PATENT OFFICE.

IVA BELLE KEMPSHALL, OF BOSTON, MASSACHUSETTS.

VEHICLE-TIRE.

957,166.  Specification of Letters Patent.  Patented May 3, 1910.

Application filed March 21, 1910. Serial No. 550,562.

*To all whom it may concern:*

Be it known that I, IVA BELLE KEMPSHALL, a citizen of the United States, residing at Boston, in the county of Suffolk and State of Massachusetts, have invented certain new and useful Improvements in Vehicle-Tires, of which the following is a specification.

This invention relates to an improvement in motor vehicle tires, and more particularly to the wear portion or shoe thereof, the object of the invention being to provide an improved tire reinforced by projections or ribs and provided in its tread with a series of suction pockets or compression chambers, the chambers and projections being located in such relation relatively to each other that the effective action of the suction chambers will not be interfered with by the projections.

Shoes or pneumatic tires which have thickened tread portions and side portions which gradually taper in thickness toward the rim or felly are admittedly advantageous as compared with tires which are of equal thickness throughout, or substantially so, especially for motor vehicles. But in the provision of such a thickened tread considerable stress is thrown on the weakened side portions, frequently breaking the latter down, and therefore it is essential in a shoe of this kind that reinforcements in the form of projections or ribs be provided for reinforcing the side portions of the shoe. To prevent skidding it is desirable that the tread be provided with openings, chambers or pockets which will act as suction or compression chambers causing the tread to adhere to the road. When these chambers, however, are located between a pair of ribs and in alinement therewith, the action of the tire or shoe under load is such, when provided with side reinforcing ribs or projections, as to force the pockets somewhat away from the road so as to prevent the effective action of the suction chambers.

The object of the present improvement, therefore, is to provide a shoe with a thickened tread having reinforcements at the sides thereof and with suction chambers for preventing skidding, but having the chambers and the projections so located relatively to each other that the projections will not interfere with the effective action of the chambers of the tread.

In the drawings, accompanying and forming part of this specification, Figure 1 is a cross-sectional view of this improved shoe or tire, taken on line 1—1 of Fig. 2; Fig. 2 is a plan view of a portion of the shoe; Fig. 3 is a side elevation thereof.

Similar characters of reference indicate corresponding parts throughout the drawings.

The present improvement is adapted for use for all classes of resilient tires, whether solid, cushioned or pneumatic, or otherwise, and when the invention is applied to a shoe, which is used in this instance to illustrate the invention, such shoe will of course be provided with the usual means for securing it in place. In the preferred form thereof shown herein, the shoe, when the tire is of pneumatic form, or the wear member thereof when the tire is of solid form, may be made of any preferred construction, the surface of which, however, is usually composed of rubber. In the present instance this wear member or shoe 2 is shown provided with a tread 2′ the tread surface 3 of which is slightly curved in cross section, although it may be entirely flat if preferred. This tread surface is somewhat thickened as compared with the sides of the tire, the sides 4 of such tire tapering in thickness away from the tread and toward the beaded or flanged edges 5 formed for the purpose of attaching the shoe to the rim or felly. In the present instance this wear member or shoe 2 is provided along its tread surface or periphery with a series of openings or chambers 6, preferably of circular formation, forming suction or compression pockets. These openings extend around the entire surface of the tire and, as stated, form compression chambers effective to grip the road surface and prevent skidding.

The sides of the tire are reinforced by the provision of ribs or projections 7 which in the present instance terminate at the tread surface or periphery of the tire, and as shown herein the ends thereof are slightly beveled or rounded to conform to the slightly curved periphery of the tread. When the tread surface, however, is entirely flat these ribs may also terminate in flat surfaces conforming to the tread. Thus it will be observed that in the present improvement the outer ends of the ribs conform to the tread surface of the shoe and terminate at such tread surface, so that when the tire is under load the outer ends of the projections, as well as the tread surface, will be brought into engagement with the roadway, so that the projections will receive a portion of the load of the tire and thus reinforce the tapering side portions of the tire in a manner which will be readily understood. These projections taper off toward their inner ends, where they merge into the side portions of the tire near the bead or flange thereof, their thickened or enlarged ends being adjacent to and terminating at the tread surface of the tire, thus greatly strengthening the sides of the tire while such thickened ends reinforce the tread surface, such ribs distributing the stress of pressure from the thick tread to the thinner sides in substantial proportion to the tapered portion of the side walls of the tire, thus obviating any tendency of the shoe or tire to break down, and this without interfering with the proper resiliency of the different portions of the tire. When the chambers, however, are located between a pair of projections and in alinement therewith, the result is that the load upon the tire is received, as hereinbefore stated, partly upon the ends of the projections, so that the chamber between a pair of projections is somewhat lifted or forced away from the road, and consequently does not adhere to the roadway as effectively as would be the case if the suction chamber was not lifted away from the road. Consequently, in the present improvement the chambers are located alternately with the ribs or projections. But in the form shown in Figs. 1, 2 and 3 each suction chamber is located alternately with a pair of ribs, which are shown disposed opposite to each other. Consequently the contact of the suction chambers with the road alternates with the contact of the ends of the ribs with the road, so that when the ends of the ribs are in engagement with the road a suction chamber will not be and when the ribs are away from the road a suction chamber will be in contact with the roadway. Thus the entire load coming upon the suction chamber enables it to adhere to and grip the roadway firmly and not be lifted away from the roadway in a manner which occurs when the suction chambers are located in alinement with the ribs. By this formation of shoe the same reinforcement is obtained of the sides of the tire, while a more effective gripping of the roadway is also obtained, thus providing a very much improved tire and obviating any tendency of the thinner side portions of the tire to break down.

I claim as my invention:

1. An anti-skidding tire for motor vehicles, having a tread portion provided with a series of chambers or pockets, the tread portion having at the sides thereof a series of projections terminating at the tread and level therewith, said compression chambers being located alternately with the projections at the sides of the tire.

2. An anti-skidding tire for motor vehicles, having a tread portion provided with a series of compression chambers or pockets, the tread portion having at the sides thereof a series of projections terminating at the tread and level therewith, said compression chambers being located alternately with pairs of projections disposed opposite to each other at the sides of the tire.

3. An anti-skidding tire for motor vehicles, having a tread portion provided with a series of chambers or pockets, a tread portion having at the sides thereof a series of projections terminating at the tread and level therewith, certain of said projections being located between certain of said compression chambers.

IVA BELLE KEMPSHALL.

Witnesses:
C. H. WEED,
F. E. BOYCE.